United States Patent [19]
Tallio et al.

[11] Patent Number: 5,408,962
[45] Date of Patent: Apr. 25, 1995

[54] ENGINE PERFORMANCE IMPROVEMENT

[75] Inventors: Kevin V. Tallio, Ypsilanti; Bruce J. Tobis, Farmington Hills, both of Mich.

[73] Assignee: Ford Motor Company, Dearborn, Mich.

[21] Appl. No.: 270,558

[22] Filed: Jul. 5, 1994

[51] Int. Cl.$^6$ .............................................. F02B 27/00
[52] U.S. Cl. ................................................. 123/184.55
[58] Field of Search ....................... 123/184.55, 184.24, 123/184.25, 184.26, 184.31, 184.34, 184.35, 184.36, 184.43, 184.44, 184.47, 184.48, 184.49, 184.51, 184.53

[56] References Cited

U.S. PATENT DOCUMENTS

| | | | |
|---|---|---|---|
| 4,690,106 | 9/1987 | Nakayama et al. | 123/184.55 |
| 4,738,229 | 4/1988 | Wada et al. | 123/184.55 |
| 4,829,941 | 5/1989 | Hitomi et al. | 123/184.55 |
| 4,846,117 | 7/1989 | Hitomi et al. | 123/184.55 |
| 4,889,082 | 12/1989 | Hitomi et al. | 123/184.55 |
| 4,989,553 | 2/1991 | Ueda et al. | 123/184.55 |
| 5,033,268 | 7/1991 | Hitomi et al. | 123/184.53 |
| 5,080,051 | 1/1992 | Hitomi et al. | 123/184.53 |
| 5,090,200 | 4/1992 | Van Basshuysen et al. | 123/184.55 |

FOREIGN PATENT DOCUMENTS 2117043 10/1983 United Kingdom ........... 123/184.36

Primary Examiner—Henry C. Yuen
Assistant Examiner—M. Macy
Attorney, Agent, or Firm—Jerome R. Drouillard; Roger L. May

[57] ABSTRACT

An apparatus for improving engine performance at wide-open throttle or full load by supercharging the induction system. An expanded/enlarged volume plenum is divided into two chambers, each containing a group of three openings for flowing air past inlet valves to three cylinders of a six cylinder engine, for example. A pair of adjustable length intake runners are connected to the upstream end of the plenum and are adjusted with changes in engine speed to resonantly tune the induction system for the speed changes to effect greater input of air to the cylinders. A valve can be opened to communicate the chambers with each other to further resonantly tune the system at intermediate speeds. At the higher engine speeds, resonant tuning in conjunction with the ram induction of air into the cylinders further increases the mass flow of air.

7 Claims, 2 Drawing Sheets

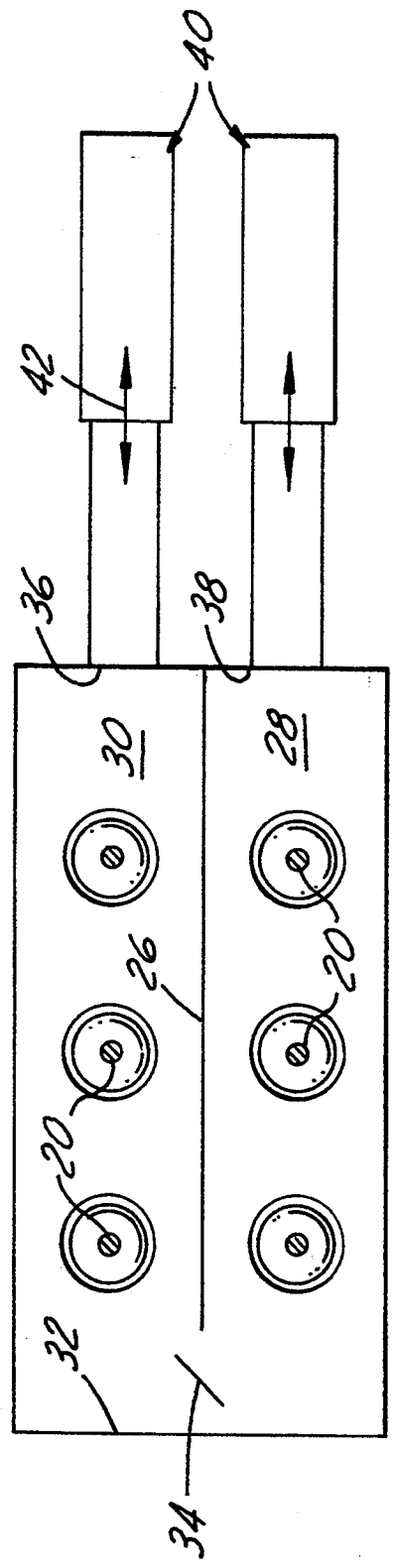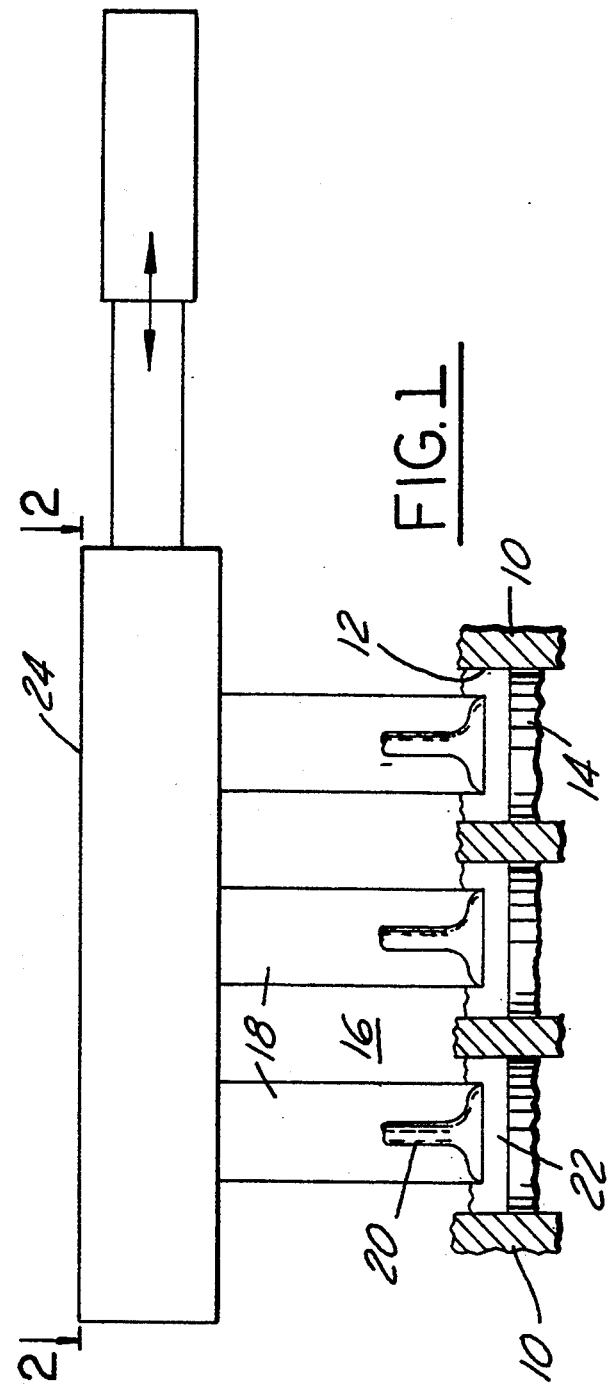

1

ENGINE PERFORMANCE IMPROVEMENT

FIELD OF THE INVENTION

This invention relates in general to an automotive type engine, and more particularly, to an apparatus for maximizing the mass flow of air into the engine cylinders at wide-open throttle or full load conditions.

BACKGROUND OF THE INVENTION

The indicated power of an internal combustion engine at a given-speed is proportional to the mass flow rate of air. Thus, inducting the maximum air mass at wide-open throttle or full load and retaining that mass in the cylinders will provide the greatest volumetric efficiency. Supercharging the engine is one way to increase the air flow and hence power density. This can be done by turbocharging, which requires external apparatus, or by resonant tuning the induction system over a wide engine speed range and/or using inertial or ram tuning at the higher engine speeds.

The resonant effect occurs as a result of the pressure waves set up by each cylinder reflected from the inlet valve back towards the intake which can be controlled to reinforce the process, and, therefore, become tuned over a wide engine speed range, which will increase the inducted air mass.

The use of resonant tuning and the inertial effect to supercharge an engine is known in general. Wide-open throttle output of an engine with a fixed geometry intake system is characterized by one or more local maxima in torque due to tuning of the induction system in a very narrow speed range. Various variable intake geometry schemes have been suggested as a means to produce a broader torque curve with improved performance over the entire speed range. These devices use adjustable components to change the primary runner geometry to affect the natural frequency of the induction system and thereby provide tuning over a broader engine speed range.

The invention utilizes both resonant and inertial tuning to maximize the mass input of air into the engine cylinders. It is known in the prior art to utilize resonant tuning to supercharge an engine by changing the effective length of the intake runner that provides the mass flow of air to the cylinders. The inertial effect at higher engine speeds is also known. However, the prior art does not provide a construction that utilizes both resonant and inertial tuning in the manner to be described in combination to maximize the mass intake of air to provide the most efficient supercharging.

Description Of The Prior Art

U.S. Pat. No. 4,846,117 Hitomi et al, describes supercharging a six cylinder engine solely by resonant tuning the intake system. A circular passage 6c is used to minimize the inertial effect by attempting to eliminate pressure wave reflection. No surge tank is provided from which a large mass of air can be drawn. The intake passages are divided into two groups to prevent overlap of intake valve openings in each group. The circular passage 6c" in FIG. 10 is closed at higher speeds by valves 32 to shorten the effective length of the intake runner and opened at lower speeds to lengthen the runner to tune the intake system over a slightly broader speed range. FIG. 12 shows an adjustable circular passage 203 that if desired can be moved from the downstream location indicated to upstream of the cylinders.

U.S. Pat. No. 4,989,553 Ueda et al, and U.S. Pat. No. 5,080,051 Hitomi et al, both use two different lengths of intake pipe alternated by valving for low and high speed operations to utilize the dynamic effect of intake air into each cylinder. Hitomi uses both resonant and inertial tuning at times. Both show six cylinder engines divided into two groups so that the inlet valves in each group each open 240 degrees apart to prevent overlap and therefore pressure losses. The two groups are permitted to communicate with each other at times for tuning purposes. In effect, two different lengths of intake passage can be used to broaden the engine speed range for maximum torque.

Brief Summary Of The Invention

The invention utilizes resonant tuning at low and intermediate speed levels, and a combination of resonant and inertial tuning or ram induction of air at higher engine speeds to supercharge tile induction system and maximize the input of mass air flow to each cylinder over a broad engine speed range.

The above is provided by a construction that includes an adjustable air intake runner connected to an expanded volume plenum divided into two chambers each containing an equal number of separate intake passages leading to the individual cylinders past conventional intake/inlet valves. The inlet valves in each group are spaced to open 240 degrees apart to prevent the firing of one cylinder after another in the group.

A control valve can be opened to communicate pressure information between the two plenum chambers to vary the effective length of the intake system and hence modify the system resonant frequency to thereby tune the system for different engine speed levels. In addition, the plenum chamber or surge tank promotes inertial or ram induction at high engine speeds to increase the pressure at intake valve closing and thereby increase the mass air intake into the cylinders.

Changing the length of the air intake runner, coupled with opening and closing the plenum control valve and providing a plenum chamber to promote the inertial effect allows a fine resonant tuning of the system over a wide engine speed range from low to high.

It is a primary object of the invention, therefore, to provide an apparatus for supercharging an engine by utilizing the resonant tuning of the induction system over a wide engine speed range and the inertial effect that occurs at higher engine speeds to maximize the mass input of air to each of the engine cylinders.

It is a further object of the invention to provide the above supercharging by a construction permitting adjustment of the length of the air intake runner connected to a plenum of expanded volume having a partition dividing the plenum into two chambers with equal numbers of openings to the engine cylinders, the openings leading to inlet valves that open 240 degrees apart to avoid overlap within the group, thereby reducing pumping losses. A control valve and a enlarged plenum chamber is provided, the control valve allowing pressure communication between the chambers of the plenum for resonant tuning at various engine speeds in combination with the adjustment of the air input runner, the plenum promoting the ram induction of input air at higher engine speeds.

Other objects, features and advantages of the invention will become more apparent upon reference to the succeeding, detailed description thereof, and to the drawings illustrating the preferred embodiment thereof.

BRIEF DESCRIPTION OF THE DRAWINGS

FIG. 1 is a schematic side elevational view, with parts broken away and in section, of an engine induction system embodying the invention.

FIG. 2 is a cross-sectional view taken on a plane indicated by and viewed in the direction of the arrows II—II of FIG. 1.

DESCRIPTION OF THE PREFERRED EMBODIMENT

Figure 3:
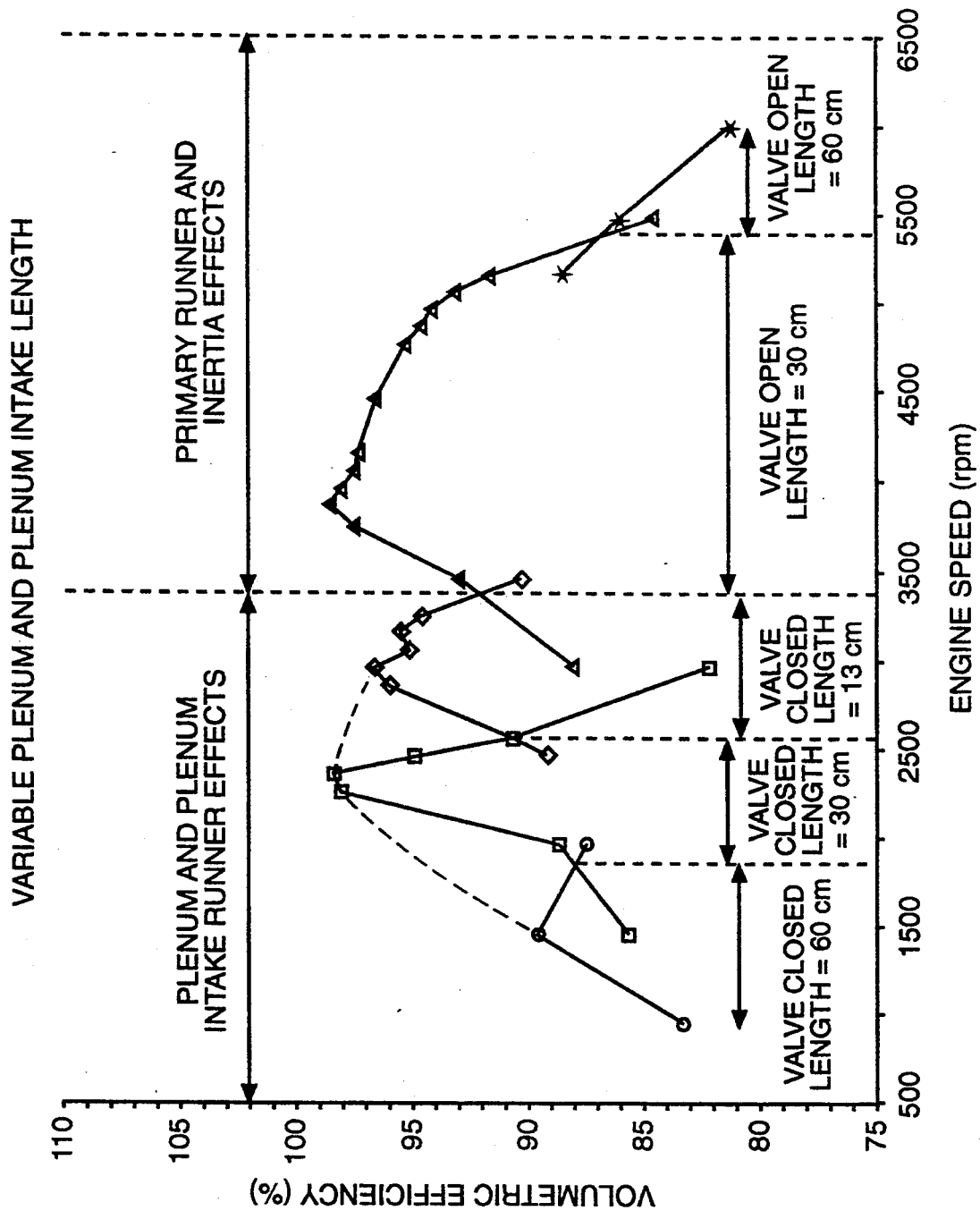
FIG. 3 graphically illustrates the changes in volumetric efficiency with changes in engine speed for an engine embodying the invention.

FIG. 1 schematically illustrates a portion of an automotive type internal combustion engine. In this case, the engine, for purposes of description, is of the six cylinder type, as indicated in FIG. 2. It includes an engine block 10 having a plurality of cylinder bores 12 reciprocably receiving therein a piston 14. A cylinder head indicated in general at 16 contains a number of air intake primary runners or passages 18, one for each cylinder, and an intake valve 20. The latter is movable conventionally between an open and closed position to control the mass flow of air through the passages into the cylinder bores. A space 22 in the cylinder bore between the piston and the intake passage defines a conventional clearance volume.

The upper ends of passages 18 open into an expanded or enlarged intake air plenum 24. A partition or wall 26 extends longitudinally for the length of the plenum and divides it into two chambers 28,30 each of which contains in this case a group of three passages. The passages are equally spaced apart and symmetrically arranged with respect to the passages on the opposite side of the partition.

The firing schedule for the cylinders is such that the intake valves for the passages of each group open 240 degrees apart so none fire after the other to avoid overlap of intake events of the three cylinders. This reduces engine pumping losses.

The plenum is closed at its downstream end by a wall portion 32. A control valve 34 is provided in a portion of the partition wall 26, in this case adjacent the downstream end, although it will be clear that it could equally be positioned at the upstream end of the plenum without departing from the scope of the invention. The control valve 34 normally is closed but openable to provide communication between the two plenum chambers.

The plenum 24 is closed except at its upstream end where a pair of openings 36,38 receive the downstream ends of a pair of tubular air intake runners 40. The upstream end of the plenum runners 40 are adapted to be connected in any suitable manner to an ambient air intake system, or to the atmosphere, in a conventional manner, for the mass intake of fresh air into the engine cylinders.

In this case, each intake runner 40 delivers fresh air to its respective chamber 28 or 30. As the arrows 42 indicate, the runners are individually and telescopically adjustable longitudinally to vary the length of each runner between maximum and minimum positions. This adjustment would be made in a scheduled manner to time the arrival of the pressure waves of the entering air at the inlet valve at the end of the intake process to raise the pressure above the nominal inlet pressure and thereby increase the inducted air mass.

That is, varying the length of the plenum intake air runners will resonant tune the pressure oscillations to the natural frequency of the air column oscillating in the induction system, which maximizes the charging efficiency and the intake of mass air into each cylinder. Thus, the induction system is properly tuned by adjustment of the intake runners to provide a desired volumetric efficiency or torque curve over a wide range of engine speeds by resonant tuning for each different speed level.

More specifically, as a piston 14 moves downwardly on the intake stroke, a reduced or negative pressure occurs at the inlet valve relative to the pressure at the plenum end of passage 18. At midstroke, the piston is near its maximum velocity and the maximum pressure drop occurs across the intake valve, which results in the maximum negative pressure or rarefaction wave at the inlet valve. The rarefaction wave travels from the inlet valve back up through the open end of the passages 18 to be reflected at the plenum as a compression wave. The compression wave becomes a positive pressure wave that forces more air into the passage. The tuning effect occurs when the compression wave arrives at the time the inlet valve closes. The induction system, therefore, is tuned for a particular engine speed at a particular length of the air inlet runner.

As the engine speed changes, the inlet runner length also is varied, in a manner to be described, to further tune the induction system for the change in engine speed. Sizing the plenum 24 to provide sufficient volume and expanding the intake runner 40 correctly will provide the correct tuning frequency for each engine speed variation. That is, the dynamics of the pressure waves in the passages and runners and the effective volumes, etc., are chosen as a function of the changes in engine speed to provide a tuned system for the various engine speeds.

In operation, therefore, and referring to FIG. 3, at low engine speeds, plenum control valve 34 will be closed and both plenum intake runners 40 moved or adjusted to their maximum outward lengths of 60 cm, for example. This will establish resonant tuning at engine speed levels below a predetermined level wherein the pressure waves arrive at the inlet valves at the proper time to maximize the influx of mass air to each cylinder.

As the speed increases progressively from its lower level, the intake runners 40 will be moved in a progressively decreasing length manner, as shown for example to 30 cm, either together or individually, until they reach the minimum length in this case of 13 cm. The peaks indicated show the high volumetric efficiency accomplished by resonant tuning at the three different lengths of the intake runners 40. While the figure shows, for purposes of illustration, only three distinct lengths, it will be clear that the progressive or infinite adjustment of the runners 40 as described would produce a performance torque curve such as shown in dotted lines.

At the point of minimum length of the runners 40, plenum control valve 34 will be opened at around 3500 RPM, for example, to communicate the levels of pressure within the two banks of passages/cylinders with each other, thereby changing the effective length of the induction system and further tuning it. The length of the intake pipe varies inversely with engine RPM to provide tuning. At the high engine speeds, therefore, small changes in the torque are still possible with plenum intake runner length variations. This is indicated in FIG. 3 by the increase in volumetric efficiency shown between engine speeds of 3500 RPM to 5500 RPM, which would be due primarily to the primary runner effects.

At still higher speeds above 5500 RPM, ram induction or the inertia effect comes into being when, due to the motion of the column of air in the inlet runner passage 18, the pressure at the intake valve during intake valve closing is increased by the momentum of the air induced by the motion of piston 14. This effect increases functionally as the square of the piston speed and becomes significant beyond the engine speed range where resonant tuning is effective. The large plenum promotes this inertial effect and ram induction by providing a reservoir of a sufficient volume to satisfy the demands of the system for the greater mass of air as the engine speed increases. Thus, it will be seen that the construction provides for a change in the effective length of the plenum intake runners and opening and closing the plenum control valve to provide resonant tuning of the induction system over a wide engine speed range providing a wide maximum torque range, and that at higher engine speeds the ram phenomenon is advantageously used in combination with resonant tuning, which supercharges each cylinder with a maximum amount of air.

While the invention has been shown and described in its preferred embodiment, it will be clear to those skilled in the arts to which it pertains that many changes and modifications may be made thereto without departing from the scope of the invention. For example, while the invention has been described in connection with a six cylinder engine, it will be clear that it would equally apply to any multi-cylinder engine. Also, the passages or primary runners 18 have been indicated as single runners. However, each could also be a dual or multiple runner without departing from the scope of the invention.

We claim:

1. An air intake system for supercharging an automotive type engine having a plurality of cylinders with reciprocable pistons therein, including a separate air intake passage connected at one end to each cylinder, an intake valve at the one end movable between open and closed positions to control the air flow into the cylinder, and an enlarged volume intake air plenum for supplying air to the individual passages and into the cylinders upon opening of the intake valves, the plenum being a closed reservoir with an opening at one end, an ambient air intake runner receivable within the opening for supplying fresh air to the plenum and therefrom to the passages and cylinders, the plenum having a partition therein dividing the plenum into two separate chambers and symmetrically arranging and aligning the intake passages on opposite sides thereof whereby the openings of the intake valves on each of the sides occur in a non-overlapping manner, the intake runner being adjustable between a maximum and minimum length to establish a broad range of resonant tunings of the air flow pressure waves as a function of changes in engine RPM, and a control valve in the partition movable between open and closed positions to control communication of air between opposite sides of the partition to change the effective length of the inlets to the passages, the control valve being closed at engine speeds below a first low speed predetermined level and open above a second high speed predetermined level, the opening and closing of the control valve together with the adjustment of the length of the intake runner providing a variable number of resonant tunings to the intake system air flow pressure waves to maximize the flow of air into the cylinders, the open condition of the control valve coupled with the enlarged volume reservoir at still higher speed operation promoting a ram effect to the air flow to further increase the mass of air flowing into the passages.

2. An intake system as in claim 1, the intake runner including a separate adjustable runner connected to each side of the partition for separate resonant tuning of the intake air pressure waves.

3. An intake system as in claim 1, wherein the separate banks of intake passages upon closure of the control valve and adjustment of the intake runner length establish resonant tuning of the air flow pressure waves below the first predetermined speed level to maximize air flow input to the cylinders, the expanded volume of the plenum over that of the intake runner promoting inertial/ram tuning at the higher engine speeds to further increase the air flow to the cylinders.

4. Am intake system as in claim 1, wherein the engine is of the six cylinder type divided into two groups of three cylinders each, the groups being symmetrically aligned with one another on opposite sides of the partition.

5. An intake system for supercharging an automotive type engine, the engine having two banks of cylinders spaced from one another, each cylinder having an air inlet passage connected thereto and an inlet valve controlling the passage of air into the cylinder, an expanded volume air intake plenum having partition means dividing the plenum into a pair of equal volume chambers, means connecting the passages of one bank to the one chamber and the passages of the other bank to the other chamber in a manner preventing overlap of the intake valve openings in their respective group, an ambient air intake runner connected to one end of the plenum to supply intake air to both chambers, the expanded volume plenum promoting a ram effect of air movement during high speed operation resulting from the inertia of the flowing air column to reinforce the ingestion of air into the cylinders, the intake runner being adjustable in length and movable as a function of changes in engine speeds to progressively resonantly tune the air flow pressure waves for further increased mass flow of air into the cylinders.

6. A system as in claim 5, including a control valve in the partition openable to communicate the air flow between the banks to together with the adjustment of the intake runner further resonant tune the pressure waves for maximum air flow into the cylinders for the particular speed level.

7. An air intake system for supercharging a multi-cylinder engine having a number of cylinders, an intake passage connected to each cylinder, and an intake valve at the junction of each passage and cylinder moveable between open and closed positions to control the flow of intake air to the cylinder, including a closed plenum having the interior thereof containing a partition dividing the plenum into a pair of equal sized chambers, each of the chambers containing multiple openings each receiving therein the opposite end of an intake passage, an air intake runner connected to the plenum chambers to supply air thereto and to the individual intake passages during the intake strokes of the cylinders, the intake valve for the passage in each chamber opening in a non-overlapping manner, the intake runner being adjustable in length as a function of change in engine speed to provide a wide band of resonant tuning promoting the maximum intake of air to the cylinders, the partition having a normally closed control valve therein openable in response to engine speeds above a predetermined level to force further air into the cylinders by the further resonant tuning of the air flow coupled with an inertial ram induction promoted by the volume of the plenum.

* * * * *